United States Patent
Aue et al.

(10) Patent No.: US 10,133,684 B2
(45) Date of Patent: Nov. 20, 2018

(54) INTEGRATED CIRCUIT HAVING ADC, DSP AND COMPUTING UNITS

(71) Applicant: Robert Bosch GmbH, Stuttgart (DE)

(72) Inventors: Axel Aue, Korntal-Muenchingen (DE); Martin Gruenewald, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 44 days.

(21) Appl. No.: 15/259,810

(22) Filed: Sep. 8, 2016

(65) Prior Publication Data

US 2017/0075826 A1 Mar. 16, 2017

(30) Foreign Application Priority Data

Sep. 11, 2015 (DE) .......... 10 2015 217 435

(51) Int. Cl.
*G06F 13/12* (2006.01)
*G06F 13/10* (2006.01)
*H04L 29/08* (2006.01)

(52) U.S. Cl.
CPC .......... *G06F 13/124* (2013.01); *G06F 13/102* (2013.01); *H04L 67/12* (2013.01)

(58) Field of Classification Search
CPC ............. H03M 1/0604; H03M 1/0607; H03M 1/0836; G06F 13/124
See application file for complete search history.

(56) References Cited

U.S. PATENT DOCUMENTS

| | | | | |
|---|---|---|---|---|
| 5,824,890 A * | 10/1998 | La Palm | ................ | G01M 15/11 123/436 |
| 6,208,247 B1 * | 3/2001 | Agre | ...................... | G01V 1/223 340/13.25 |
| 6,728,796 B2 * | 4/2004 | Aue | ..................... | G11C 7/1006 708/303 |
| 7,071,642 B2 * | 7/2006 | Wilton | .................. | B60L 3/0046 180/197 |
| 7,245,638 B2 * | 7/2007 | Agazzi | ................ | H03M 1/0624 370/516 |
| 7,564,866 B2 * | 7/2009 | Agazzi | ................ | H03M 1/0624 370/463 |
| 8,106,788 B2 * | 1/2012 | Ohl | ....................... | G01D 3/0365 340/439 |
| 8,571,777 B2 * | 10/2013 | Greene | .................... | B60D 1/30 701/70 |
| 9,050,185 B2 * | 6/2015 | Pugh | ......................... | G02C 7/04 |
| 9,580,890 B2 * | 2/2017 | Nee | ............................ | E02F 9/26 |
| 9,735,812 B2 * | 8/2017 | Schmalzl | ............. | H04B 1/0475 |
| 9,835,712 B2 * | 12/2017 | Kollmer | .................... | G01S 7/02 |
| 2013/0297840 A1 * | 11/2013 | Kagan | ..................... | G06F 13/12 710/69 |

* cited by examiner

*Primary Examiner* — Brian T Misiura
(74) *Attorney, Agent, or Firm* — Norton Rose Fulbright US LLP; Gerard Messina

(57) ABSTRACT

An integrated circuit, preferably for controlling vehicle functions, having an analog-digital converter for converting an analog signal into digital measurement values, a DSP unit, connected downstream from the analog-digital converter, for pre-processing the digital measurement values, a central computing unit, connected to the DSP unit so as to transmit data, for further processing of the digital measurement values, the DSP unit being set up to control the analog-digital converter during operation.

15 Claims, 1 Drawing Sheet

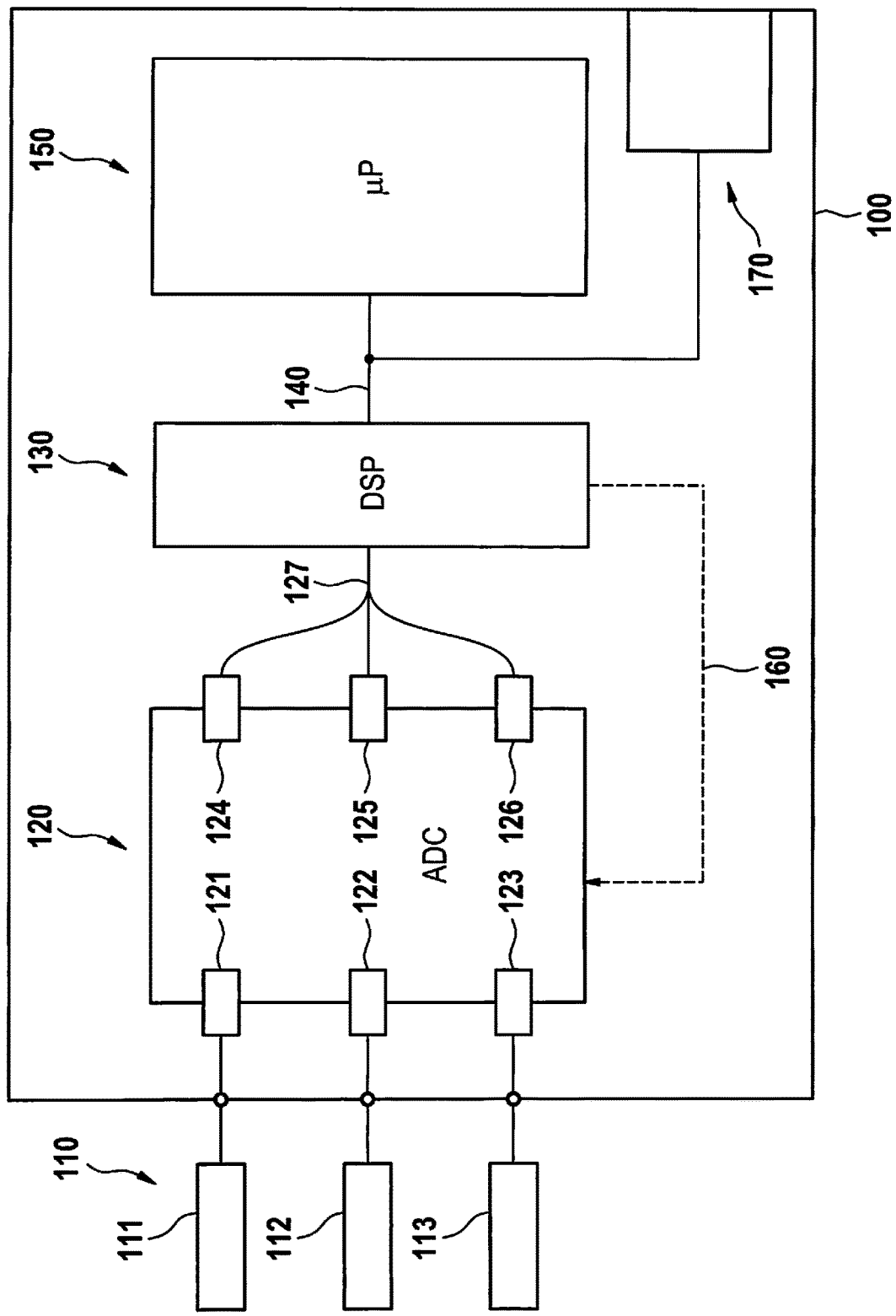

INTEGRATED CIRCUIT HAVING ADC, DSP AND COMPUTING UNITS

CROSS REFERENCE

The present application claims the benefit under 35 U.S.C. § 119 of German Patent Application No. DE 102015217435.2 filed on Sep. 11, 2015, which is expressly incorporated herein by reference in its entirety.

FIELD

The present invention relates to an integrated circuit, in particular for controlling vehicle functions.

BACKGROUND INFORMATION

Using digital signal processing (DSP), signals can be digitally processed so that for example frequency filtering, compression, noise suppression, etc., can be carried out. Digital signal processing can be carried out by a microprocessor or by a dedicated DSP unit, such as a digital signal processor (DSP) or a so-called state machine that can calculate digital filtering algorithms such as FIR, IIR, FFT, and others (settable via parameters). However, even in the second case the microprocessor is stressed because it has to control the DSP unit. However, this is disadvantageous in particular in areas in which the computing power is to be used as efficiently as possible, using as little energy as possible, such as in the area of (motor) vehicles.

SUMMARY

According to the present invention, an integrated circuit is provided, as is a use of such an integrated circuit for controlling vehicle functions. Advantageous embodiments are the subject matter of the description below.

In the context of the present invention, during operation the central computing unit, e.g., microprocessor, of an integrated circuit, such as of a microcontroller, is relieved of DSP computing tasks and controlling tasks by connecting a separate DSP path of a DSP unit for processing measurement values downstream from an analog-digital converter path, connected to an analog input of the integrated circuit, of an analog-digital converter (ADC) having a plurality of ADC paths, so that the central computing unit obtains measurement values that have already been preprocessed without having to expend computing power or computing time on this. The communication between the analog-digital computer and DSP unit runs directly via a circuit-internal bus (e.g., internal address/data bus, which can also be fashioned as an NOC (network on chip)), and, in normal operation, runs without participation of the central computing unit. The communication between the DSP unit and the central computing unit also takes place via the circuit-internal bus, or is carried out by the central computing unit as a direct memory access (DMA). Here, the DSP unit is set up to control the analog-digital converter during operation, i.e., to modify, to the extent desired, its specifiable parameters (e.g., conversion interval, resolution, gain, trigger thresholds, diagnostic functions, and others), for example in accordance with a process controlling or as a function of a raw value provided by the analog-digital converter. All named elements are components of one and the same integrated circuit, e.g., microcontroller.

Such an integrated circuit can advantageously be used in particular in the automotive field, or in general for controlling vehicle functions, e.g., as a microcontroller for control devices, because there a particularly efficient use of computing power and computing time is particularly advantageous. In the automotive field, the portion of digital signal processing during operation is becoming ever greater, while however the computing power cannot be arbitrarily increased for reasons of space, cost, waste heat, and energy supply. All functions in which the measurement value processing is time-critical, e.g., engine functions (e.g. fuel metering, ignition, regulation of a combustion chamber pressure, etc.), transmission functions, clutch functions, brake functions (e.g. ABS), drive functions (e.g. ESP), safety functions (airbag, proximity warning, cruise control, navigation, self-driving), etc., can advantageously be controlled.

In conventional microcontrollers, the DSP functions can either be calculated entirely by the microprocessor, or at least the data are supplied by the microprocessor to the DSP unit and the calculation is initiated and controlled there. In the first case, the DSP functions have to be inserted into the task scheduling of the operating system, which becomes very inefficient if the DSP functions are required frequently, due to the task changeover required for this. In the second case, the data have to be transmitted back and forth, which is also resource-intensive.

Through the solution according to the present invention, the signal processing can be improved, such that for example fewer precise signals can also be used, or analog filters can be digitized. This makes it possible to reduce the signal line outlay, e.g. to simplify an external shielding or to omit external filters (e.g. RC filters). In this way, the system costs can be reduced.

On the other hand, higher degrees of precision, and thus better functioning, can be achieved with existing signals. The complexity of the software system on the central computing unit can be reduced.

Usefully, the integrated circuit additionally makes use of an output unit that is connected to the DSP unit and/or to the central computing unit so as to be capable of data transmission. Further preferably, the DSP unit is set up to transmit the digital measurement values to the output unit. As output unit, preferably a digital-analog converter, a port module, a timer module, or the like is used. For vehicle functions, frequently a timer module is used as output unit, which for example switches an output (HIGH-LOW and vice versa) when specified counter values are reached (which can correspond for example to crankshaft positions). In the context of the present invention, in particular such counter values can be computed particularly easily by the DSP unit and transmitted to the output unit directly, without a detour via the central computing unit.

According to a preferred specific embodiment, the analog-digital converter has various ADC paths each having an input and an output, each having a separate DSP path connected downstream. Each of the ADC paths can be provided for example for a specific sensor. In each of these different ADC paths, a respective analog signal is converted into a digital output signal. An advantage of this is the capacity for independent configuration of the various DSP paths (each realized by themselves or in groups by a separate DSP unit). In this way, for example different DSP functions, and/or the same DSP functions but with different parameters, can be carried out for different paths. In this way, in particular it is possible to subject each of the individual ADC paths to a digital signal processing in parallel and without mutual influence. In particular, each DSP path can be treated individually according to the system operating point.

Preferably, the configuration of the DSP unit, or of a DSP path, can take place as a function of the raw value (e.g., as a function of the amplitude or variance/noise of the raw value curve) in order to improve the signal quality. Preferably, the DSP unit is set up to carry out this configuration itself, e.g., in accordance with a process controlling.

Preferably, in the course of the pre-processing the DSP unit uses digital signal processing to carry out a filtering, an amplification, and/or an improvement of the signal quality of the provided digital output signals. In particular, in this way external filters can be omitted, and in particular no additional filters fashioned as hardware components are required. Depending on the performance capacity of the DSP unit, however, comprehensive or complex functions can also be carried out, so that it is not possible to draw a sharp boundary between pre-processing and further processing, and in some circumstances the pre-processing is already so extensive that no further processing is then required.

Advantageously, the integrated circuit is used for a so-called controlled valve operation (CVO). In the course of a control valve operation (CVO), in particular injection valves of the internal combustion engine of the motor vehicle are controlled and an injection calibration of the injection valves is carried out. The injection valves are actuated in particular by an actuator that is controlled with a control quantity that has a control duration. During the injection, from the respective opening and closing time of an injection valve, the valve opening duration of the respective valve needle, and thus the actual injected quantity of the respective injection valve, can be determined and corrected if necessary. In particular, in the course of the control valve operation a target value for the valve opening duration is modified as a function of a regulating difference between the target value for the valve opening duration and an actual value of the valve opening duration. The target value can be communicated to a timer as output unit, for example as a time difference. The method for data transmission is suitable in particular for a controlled valve operation because in the course thereof numerous measurement values are digitally post-processed and evaluated.

Further advantages and embodiments of the present invention result from the description below and the figure.

The present invention is shown schematically in the figure on the basis of an exemplary embodiments, and is described in the following with reference to the figure.

BRIEF DESCRIPTION OF THE DRAWING

FIG. 1 schematically shows a preferred embodiment of a data transmission system according to the present invention of a motor vehicle, set up to carry out a preferred specific embodiment of a method according to the present invention.

DETAILED DESCRIPTION OF EXAMPLE EMBODIMENTS

FIG. 1 schematically shows a preferred embodiment of an integrated circuit according to the present invention, designated 100. Integrated circuit 100 can be fashioned for example as a microcontroller of a control device, or engine control device, of a motor vehicle, which carries out a controlling of an internal combustion engine of the motor vehicle (engine controlling).

For this purpose, sensors 110 are situated in or near the internal combustion engine. For example, sensor 111 is fashioned as a pressure sensor in a combustion chamber of the internal combustion engine, sensor 112 as a temperature sensor, and sensor 113 as a rotational speed sensor.

From measurement values of these sensors 110, in microcontroller 100 control values for actuators are determined in the course of the engine controlling, and are outputted to outputs (not shown). In order to enable processing of the measurement values of sensors 110 in microcontroller 100, the microcontroller has available to it an analog-digital converter (ADC) 120, a digital signal processing unit or DSP unit (DSP) 130, and a central computing unit fashioned as a microprocessor (µP) 150. An output unit 170, e.g., a digital-analog converter, port module, timer module, or the like, is responsible for the output.

Analog-digital converter 120 has three inputs 121, 122, and 123, of which each is connected, via sensor inputs of the microcontroller, to one of the sensors 111, 112, or 113. In addition, analog-digital converter 120 has three outputs 124, 125, and 126 that in the present example are each assigned to one of the sensors 111, 112, or 113. Each of the sensors 110 acquires analog input signals as measurement values. The analog input signal of each sensor 111, 112, and 113 is present at the respective input 121, 122, or 123 of analog-digital converter 120, is digitized by the converter, and is provided at the respective output 124, 125, or 126 as digital output signal, or raw value. Thus, the three inputs and outputs 121 through 126 realize three ADC paths in analog-digital converter 120, with which the data of one of the sensors 111 through 113 are respectively processed.

Each of the three outputs 124, 125, and 126 is connected to DSP unit 130. In particular, outputs 124, 125, and 126 can be connected to DSP unit 130 via a microcontroller-internal bus 127. DSP unit 130 receives the three digital output signals of sensors 111, 112, 113, and carries out a respective digital signal processing for each of the digital output signals independently of one another, in order to pre-process each of these. For this purpose, the DSP unit has available to it in particular a plurality of parallel DSP paths that can realize DSP functions independently of one another and in particular simultaneously. A separate DSP function, or the same DSP function but with different parameters, can thus be carried out for each of the digital output signals.

In the course of this pre-processing, each of the three digital output signals is for example filtered and amplified. For example, for each of the three digital output signals a high-pass filter can be applied, with individual parameters in each case.

During operation, analog-digital converter 120 is controlled by DSP unit 130, symbolized by connection 160. The controlling includes for example the setting of parameters such as conversion interval, resolution, gain, trigger thresholds, diagnostic functions, and others. For example, DSP unit 130 is set up to control analog-digital converter 120 as a function of the supplied raw values. Thus, for example the resolution or gain can be adapted to an expected raw value. The expectation is usefully based on a temporal development of the raw values (raw value curve) and empirically acquired values. For example, DSP unit 130 is also set up to control its own functionality as a function of the supplied raw values. In this way, the pre-processing can be adapted to the present raw values.

According to a first alternative, the digital output signals pre-processed in this way are transmitted to microprocessor 150 by DSP unit 130 via a microcontroller-internal bus 140 or via a direct memory access (DMA). The microprocessor further processes these pre-processed digital output signals, and, in the described example, in the course of the engine controlling determines from these signals control values for actuators, which it transmits to output unit 170, standardly also via bus 140. According to a further alternative, the pre-processed digital output signals are transmitted to output unit 170 by DSP unit 130 via microcontroller-internal bus 140 directly and without intermediate connection of microprocessor 150, or via a direct memory access (DMA). This alternative is appropriate if the pre-processing is adequate and the digital output signals are to be further processed for example in a different computing unit, or if no further processing at all is required.

It can be provided that microprocessor 150 can also access microcontroller-internal bus 127; for example, bus 140 and bus 127 can physically be the same bus. However, an access of microprocessor 150 to analog-digital converter 120 does not take place during normal operation; here, the controlling of analog-digital converter 120 is completed by DSP unit 130. An access can for example take place at the beginning of operation in order to set up analog-digital converter 120 and DSP unit 130, e.g., in order to set up the process controlling and the initial parameters.

What is claimed is:

1. An integrated circuit, comprising:
    an analog-digital converter for receiving a plurality of analog signals from a plurality of sensors and converting the plurality of analog signals into corresponding digital measurement values;
    a digital signal processing (DSP) unit, connected to the analog-digital converter downstream from the analog-digital converter, for directly receiving the digital measurement values from the analog-digital converter without participation of a central computing unit, and pre-processing the digital measurement values;
    the central computing unit, connected to the DSP unit downstream from the DSP unit, for receiving and further processing at least some of the pre-processed digital measurement values; and
    an output unit to transmit data to outside the integrated circuit;
    wherein the DSP unit is configured to control the analog-digital converter during operation; and
    wherein the DSP unit is configured to transmit to the output unit at least some of the pre-processed digital measurement values at least one of: (i) via an internal bus of the integrated circuit, directly and without participation of the central computing unit, and (ii) via a direct memory access (DMA) without participation of the central computing unit.

2. The integrated circuit as recited in claim 1, wherein the analog-digital converter has a plurality of ADC paths and the DSP unit having a plurality of DSP paths, a DSP path of the plurality of DSP paths being respectively assigned to each ADC path of the plurality of ADC paths.

3. The integrated circuit as recited in claim 2, wherein no two ADC paths of the plurality of ADC paths having assigned to them the same DSP path of the plurality of DSP paths.

4. The integrated circuit as recited in claim 3, wherein each DSP path of the plurality of DSP paths being respectively configurable independently of other DSP paths of the plurality of DSP paths.

5. The integrated circuit as recited in claim 1, wherein the integrated circuit is set up such that during operation a communication takes place between the analog-digital converter and the DSP unit without participation of the central computing unit.

6. The integrated circuit as recited in claim 1, wherein the DSP unit is a digital signal processor or a state machine.

7. The integrated circuit as recited in claim 1, wherein the central computing unit is a microprocessor.

8. The integrated circuit as recited claim 1, wherein the integrated circuit is a microcontroller.

9. The integrated circuit as recited in claim 1, wherein the DSP unit is configured to transmit to the output unit at least some of the pre-processed digital measurement values via the internal bus of the integrated circuit directly and without participation of the central computing unit.

10. The integrated circuit as recited in claim 1, wherein the DSP unit is configured to transmit to the output unit at least some of the pre-processed digital measurement values via the direct memory access (DMA) without participation of the central computing unit.

11. The integrated circuit as recited in claim 1, wherein the output unit is a timer module, the timer module switching an output of the timer module between HIGH and LOW when counter values are reached.

12. The integrated circuit as recited in claim 11, wherein the counter values are computed by the DSP and are transmitted from the DSP to the timer module directly, without a detour to the central computing unit.

13. The integrated circuit as recited in claim 1, wherein the output unit is one of a digital-analog converter, a port module, or a timer module.

14. A method of using an integrated circuit, comprising:
    providing an integrated circuit, the integrated circuit including an analog-digital converter for receiving a plurality of analog signals from a plurality of sensors and converting the plurality of analog signals into corresponding digital measurement values, a digital signal processing (DSP) unit, connected to the analog-digital converter downstream from the analog-digital converter, for directly receiving the digital measurement values from the analog-digital converter without participation of a central computing unit, and pre-processing the digital measurement values, and the central computing unit, connected to the DSP unit downstream from the DSP unit for receiving and further processing at least some of the pre-processed digital measurement values, and an output unit to transmit data to outside the integrated circuit, wherein the DSP unit is configured to control the analog-digital converter during operation, and wherein the DSP unit is configured to transmit to the output unit at least some of the pre-processed digital measurement values at least one of: (i) via an internal bus of the integrated circuit, directly and without participation of the central computing unit, and (ii) via a direct memory access (DMA) without participation of the central computing unit; and
    controlling vehicle functions using the integrated circuit.

15. The method as recited in claim 14, wherein at least one of the following vehicle functions are controlled using the integrated circuit: engine functions, transmission functions, clutch functions, brake functions, drive functions, or safety functions.

* * * * *